US009740763B2

(12) United States Patent
Fang et al.

(10) Patent No.: US 9,740,763 B2
(45) Date of Patent: Aug. 22, 2017

(54) ONTOLOGY DECOMPOSER

(71) Applicant: EMPIRE TECHNOLOGY DEVELOPMENT LLC, Wilmington, DE (US)

(72) Inventors: Jun Fang, Xi'An (CN); Daqi Li, Xi'An (CN); Yue Niu, Xi'An (CN)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

(21) Appl. No.: 14/777,668

(22) PCT Filed: Nov. 19, 2014

(86) PCT No.: PCT/CN2014/091513
§ 371 (c)(1),
(2) Date: Sep. 16, 2015

(87) PCT Pub. No.: WO2016/078004
PCT Pub. Date: May 26, 2016

(65) Prior Publication Data
US 2016/0140203 A1 May 19, 2016

(51) Int. Cl.
*G06F 17/30* (2006.01)
(52) U.S. Cl.
CPC .. *G06F 17/30584* (2013.01); *G06F 17/30312* (2013.01); *G06F 17/30569* (2013.01)
(58) Field of Classification Search
CPC .................................................. G06F 17/30
See application file for complete search history.

(56) References Cited

U.S. PATENT DOCUMENTS 8,275,784 B2   9/2012 Cao et al.
8,341,173 B2   12/2012 Li et al.
(Continued)

FOREIGN PATENT DOCUMENTS

CN   101853257 A   6/2010
CN   101996208 A   3/2011

OTHER PUBLICATIONS

Etminani et al. "Overlapped Ontology Partitioning Based on Sematic Similarity Measures", Telecommunications (IST), 2010 Interntional Symposium on. Dec. 4-6, 2010, pp. 1013-1018.*

(Continued)

*Primary Examiner* — Khanh Pham
(74) *Attorney, Agent, or Firm* — Moritt Hock & Hamroff LLP; Steven S. Rubin, Esq.

(57) ABSTRACT

Technologies are generally described for methods and systems effective to store a source ontology that is effective to represent first explicit data and second explicit data. In an example, a processor may evaluate the source ontology to identify the first explicit data and the second explicit data. The processor may also identify a relationship between the first and second explicit data. The processor may also partition the source ontology into first decomposed data and second decomposed data based on the relationship between the first and second explicit data. The first decomposed data may include the first explicit data, and the second decomposed data may include the second explicit data. The processor may also store the first decomposed data in a first concealment module. The processor may also store the second decomposed data in a second concealment module that may be different from the first concealment module.

14 Claims, 6 Drawing Sheets

(56) References Cited

U.S. PATENT DOCUMENTS

| | | | |
|---|---|---|---|
| 2004/0093344 A1* | 5/2004 | Berger | G06F 17/30604 707/999.102 |
| 2007/0198449 A1* | 8/2007 | Fokoue-Nkoutche | G06N 5/04 706/47 |
| 2009/0254572 A1 | 10/2009 | Redlich et al. | |
| 2010/0174754 A1* | 7/2010 | B'Far | G06F 17/30507 707/794 |
| 2011/0029514 A1 | 2/2011 | Kerschberg et al. | |
| 2011/0282862 A1* | 11/2011 | Loeb | G06F 17/30684 707/710 |
| 2013/0060774 A1 | 3/2013 | Shepherd et al. | |
| 2014/0325666 A1* | 10/2014 | Gkoulalas-Divanis | G06F 17/30289 726/26 |
| 2015/0186653 A1* | 7/2015 | Gkoulalas-Divanis | G06F 17/30371 726/26 |

OTHER PUBLICATIONS

"Graph partition," accessed at http://web.archive.org/web/20141024070440/http://en.wikipedia.org/wiki/Graph_partition accessed on Aug. 12, 2015, 9 pages.

"Information hiding", accessed at http://web.archive.org/web/20141102183758/http://en.wikipedia.org/wiki/Information_hiding accessed on Aug. 12, 2015, 5 pages.

"OWL 2 Web Ontology LanguageDocument Overview," accessed at http://web.archive.org/web/20141028110718/http://www.w3.org/TR/owl2-overview, Dec. 11, 2012, 8 pages.

International Search Report and Written Opinion for International Application No. PCT/CN2014/091513 mailed Aug. 5, 2015, 8 pages.

Martinez, S., et al., "Semantic adaptive microaggregation of categorical microdata," retrieved from http://www.sciencedirect.com/science/article/pii/S0167404812000648, Computers & Security, vol. 31, Issue 5, Jul. 2012, pp. 653-672.

* cited by examiner

ONTOLOGY DECOMPOSER

CROSSREFERENCE TO RELATED APPLICATION

This application is the U.S. National Stage filing under 35 U.S.C. §371 of International Application No. PCT/CN2014/091513, filed on Nov. 19, 2014. The disclosure of the International Application is hereby incorporated herein by reference in its entirety.

BACKGROUND

Unless otherwise indicated herein, the materials described in this section are not prior art to the claims in this application and are not admitted to be prior art by inclusion in this section.

An ontology may be effective to represent a set of semantic data. Each piece of semantic data in the set may be effective to indicate one or more pieces of knowledge related to one or more concepts. In some examples, one or more pieces of semantic data may be processed by a processor to produce or deduce additional semantic data.

SUMMARY

In some examples, methods to store a source ontology that is effective to represent first explicit data and second explicit data are generally described. The methods may include evaluating, by a processor, the source ontology to identify the first explicit data and the second explicit data. The methods may also include identifying, by the processor, a relationship between the first and second explicit data. The methods may also include partitioning, by the processor, the source ontology into first decomposed data and second decomposed data based on the relationship between the first and second explicit data. The first decomposed data may include the first explicit data. The second decomposed data may include the second explicit data. The methods may also include storing, by the processor, the first decomposed data in a first concealment module. The methods may also include storing, by the processor, the second decomposed data in a second concealment module that may be different from the first concealment module.

In some examples, systems effective to store a source ontology that is effective to represent first explicit data and second explicit data are generally described. The system may include a memory, a first concealment module, a second concealment module, and a processor. The memory may be configured to store the source ontology. The processor may be configured to be in communication with the memory, the first concealment module, and the second concealment module. The processor may be configured to evaluate the source ontology to identify the first explicit data and the second explicit data. The processor may also be configured to identify a relationship between the first and second explicit data. The processor may also be configured to partition the source ontology into first decomposed data and second decomposed data based on the relationship between the first and second explicit data. The first decomposed data may include the first explicit data. The second decomposed data may include the second explicit data. The processor may also be configured to store the first decomposed data in the first concealment module. The processor may also be configured to store the second decomposed data in the second concealment module.

In some examples, devices effective to partition an ontology that is effective to represent first explicit data and second explicit data are generally described. The devices may include a receiver unit and a decomposition unit. The receiver unit may be configured to receive the ontology. The decomposition unit may be configured to be in communication with the receiver unit. The decomposition unit may be configured to identify a relationship between the first and second explicit data. The decomposition unit may also be configured to generate fundamental data based on the ontology and based on the identified relationship between the first and second explicit data. The decomposition unit may also be configured to partition the ontology into first decomposed data and second decomposed data based on the fundamental data. The first decomposed data may include the first explicit data. The second decomposed data may include the second explicit data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Briefly stated, technologies are generally described for methods and systems effective to store a source ontology that is effective to represent first explicit data and second explicit data. For example, the first explicit data may be "A and B works in Brooklyn", the second explicit data may be "Brooklyn is in New York", and the source ontology may include a set of explicit data that may include the first and second explicit data. In an example, a processor may evaluate the source ontology to identify the first explicit data and the second explicit data based on whether the first and second explicit data may be deduced from the source ontology. For example, the processor may evaluate the first explicit data with the second explicit data to determine if the second explicit data may be deduced based on the first explicit data. The processor may also identify a relationship, such as a logic relation that may indicate a common concept, a common description, a common knowledge, etc., between the first and second explicit data. For example, the processor may identify the relationship based on a match resulted from a comparison between the first and second explicit data. In the example, the first and second explicit data may include a common "place", such as "Brooklyn", which may indicate a relationship between the first and second explicit data. The processor may also partition the source ontology into first decomposed data and second decomposed data based on the relationship between the first and second explicit data. For example, partition of the source ontology into the first decomposed data may be based on a number of relationships associated with the first explicit data, where the relationship between the first and second explicit data may be among the number of relationships. The first decomposed data may include the first explicit data, and the second decomposed data may include the second explicit data. For example, the processor may partition the source ontology based on a one or more sets of relationships that may include the relationship between the first and second explicit data. The processor may also store the first decomposed data in a first concealment module. The processor may store the second decomposed data in a second concealment module that may be different from the first concealment module.

Figure 1:
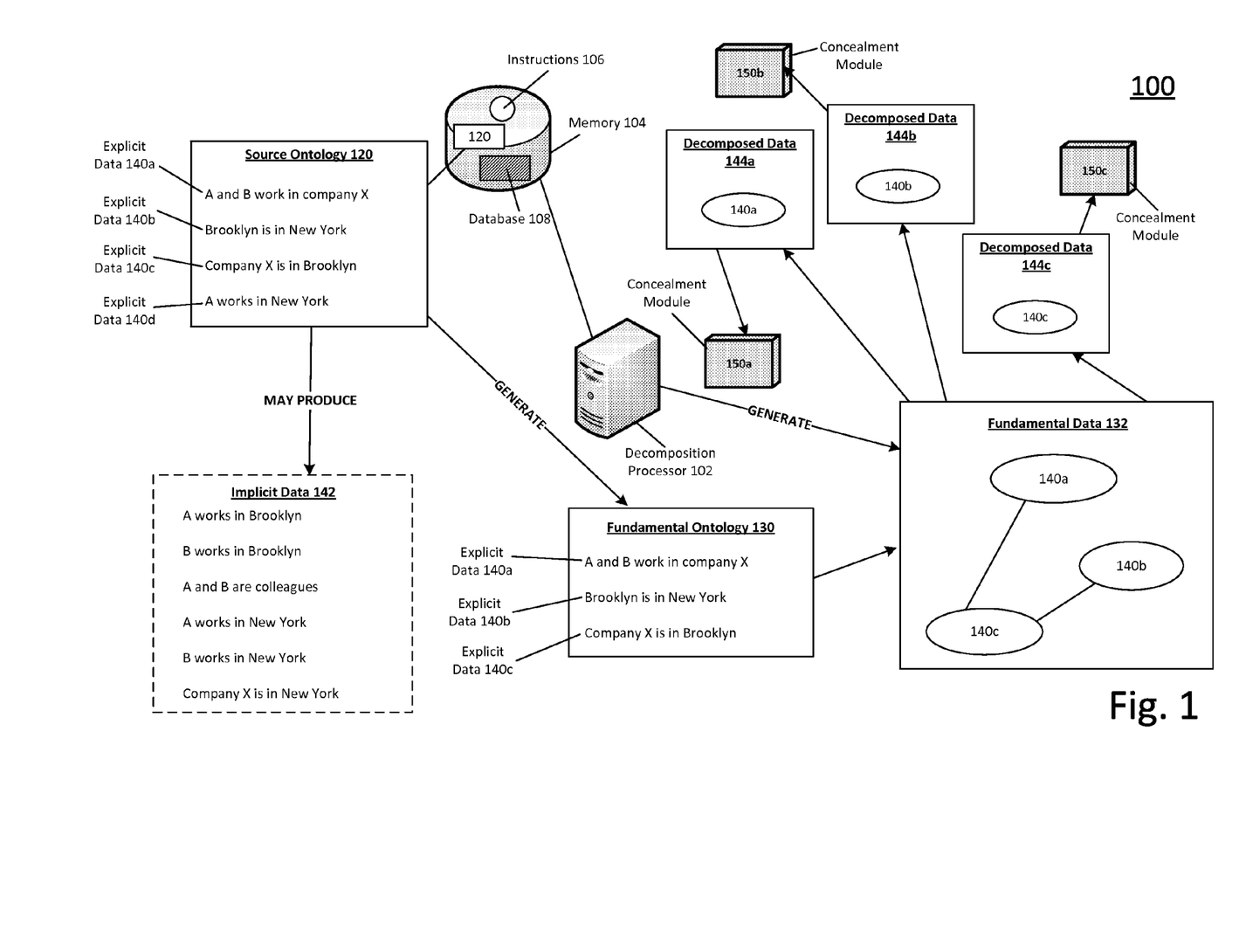
FIG. 1 illustrates an example system that can be utilized to implement an ontology decomposer.

FIG. 1 illustrates an example system 100 that can be utilized to implement an ontology decomposer, arranged in accordance with at least some embodiments described herein. System 100 may include a decomposition processor 102, a memory 104, and/or a set of concealment modules 150 (including concealment modules 150a, 150b, 150c, etc.). Memory 104 may be configured to store a source ontology 120 that may be effective to represent one or more pieces of explicit data 140 (including explicit data 140a, 140b, 140c, 140d). Explicit data 140 may be semantic data effective to describe or indicate knowledge related to one or more objects (further described below). Each piece of explicit data 140 may be used to produce implicit data 142 (further described below). Implicit data 142 may be a set of semantic data that may be produced from explicit data 140, but may not be represented by source ontology 120, and may not be stored in memory 104. As will be described below, decomposition processor 102 may identify one or more pieces of explicit data 140, based on an evaluation of source ontology 120, in order to generate a fundamental ontology 130. Decomposition processor 102 may generate fundamental data 132 (further described below) based on fundamental ontology 130 (further described below). Decomposition processor 102 may partition source ontology 120 (further described below) into a set of decomposed data 144 (including decomposed data 144a, 144b, 144c) based on fundamental data 132. Decomposition processor 102 may further distribute decomposed data 144 in concealment modules 150 such that portions of source ontology 120 may be stored in concealment modules 150 (including concealment modules 150a, 150b, 150c).

Decomposition processor 102, memory 104, and/or concealment modules 150 may be configured to be in communication with each other. In some examples, decomposition processor 102, memory 104, and/or at least a subset of concealment modules 150 may be housed in a same device. In some examples, concealment modules 150 may be housed in a housing that may exclude decomposition processor 102 and/or memory 104. In some examples, subsets of concealment modules 150 may be housed in respective housings. In some examples, each concealment module among concealment modules 150 may be a memory module. Memory 104 may be configured to store instructions 106 that may facilitate an implementation of system 100. In some examples, decomposition processor 102 may be a device. In some examples, decomposition processor 102 may be a decomposition unit (or a processing unit) of a device, where the device may include a receiver unit that may be configured to receive data, such as source ontology 120, from another entity such as memory 104.

Each piece of explicit data 140 may be effective to indicate a concept, or knowledge, associated with an object, such as a person, an item, a theory, etc. For example, as depicted, explicit data 140 may indicate more than one concept, such as "A and B work in company X" (depicted as explicit data 140a), "Brooklyn is in New York" (depicted as explicit data 140b), "Company X is in Brooklyn" (depicted as explicit data 140c), "A works in New York" (depicted as explicit data 140d), etc. Decomposition processor 102 may evaluate source ontology 120, based on instructions 106, to identify one or more pieces of explicit data 140 based on whether each piece of explicit data 140 may be deduced from source ontology 120 (further described below). In some examples, evaluation of source ontology 120 may include evaluating each piece of explicit data 140. Decomposition processor 102 may generate fundamental ontology 130 based on the identified explicit data 140.

In the example, decomposition processor 102 may evaluate explicit data 140a based on instructions 106, such as by comparing explicit data 140a with explicit data 140b, 140c, 140d. Based on the evaluation, decomposition processor 102 may determine that explicit data 140a may not be deduced, or derived, based on explicit data 140b, 140c, and 140d. For example, "Brooklyn is in New York" (explicit data 140b) may be insufficient to deduce, "A and B work in company X" (explicit data 140a). Similarly, "Company X is in Brooklyn" (explicit data 140c) and "A works in New York" (explicit data 140d) may also be insufficient to deduce explicit data 140a. Decomposition processor 102 may identify explicit data 140a as being fundamental based on the result of the evaluation (that explicit data 140a may not be deduced based on other explicit data in source ontology 120). Decomposition processor 102 may generate fundamental ontology 130 such that fundamental ontology 130 may include explicit data 140a. In some examples, decomposition processor 102 may evaluate each piece of explicit data 140 based on an order defined by instructions 106. For example, instructions 106 may indicate that decomposition processor 102 should first evaluate explicit data 140a, then explicit data 140b, then explicit data 140c, then explicit data 140d.

In the example, decomposition processor 102 may evaluate explicit data 140d based on instructions 106, such as by comparing explicit data 140d with explicit data 140a, 140b, 140c. Based on the evaluation, decomposition processor 102 may determine that explicit data 140d may be deduced based on explicit data 140a and/or explicit data 140b. For example, "A and B work in company X" (explicit data 140a), "Company X is in Brooklyn" (explicit data 140c), and "Brooklyn is in New York" (explicit data 140b) may be used to deduce "A works in New York" (explicit data 140d). Decomposition processor 102 may determine that explicit data 140d may be deduced based on at least one piece of explicit data 140, and in response, may identify explicit data 140d as not being fundamental, and may exclude explicit data 140c from fundamental ontology 130.

In the example, after evaluation of each piece of explicit data 140, decomposition processor 102 may generate fundamental ontology 130. Fundamental ontology 130 may be generated such as by compiling, collecting, or aggregating, explicit data 140 which are identified by decomposition processor 102 based on the evaluation of source ontology 120 and excluding data determined to be not fundamental. Decomposition processor 102 may then generate fundamental data 132 based on fundamental ontology 130, which will be described in more detail below. Decomposition processor 102 may further partition source ontology 120 into decomposed data 144 based on instructions 106 and/or fundamental data 132. In some examples, a number of pieces of decomposed data 144 may be based on a number of concealment modules 150 that may be available to store semantic data 122. A distribution of decomposed data 144 in concealment modules 150 may allow portions of source ontology 120 to be stored in concealment modules 150 independently. As a result of storing portions of source ontology 120 independently, at least a portion of implicit data 142 may be concealed as well. For example, an implementation of system 100 may result in explicit data 140a, 140b, 140c being stored in concealment modules 150a, 150b, 150c, respectively. Thus, a piece of implicit data 142 such as "A works in Brooklyn" may be concealed, or may not be produced. In some examples, memory 104 may be configured to store a database 108 that may be effective to indicate storage locations of each piece of decomposed data 144, such as storage of decomposed data 144a, 144b, 144c in concealment modules 150a, 150b, 150c, respectively.

Figure 2:
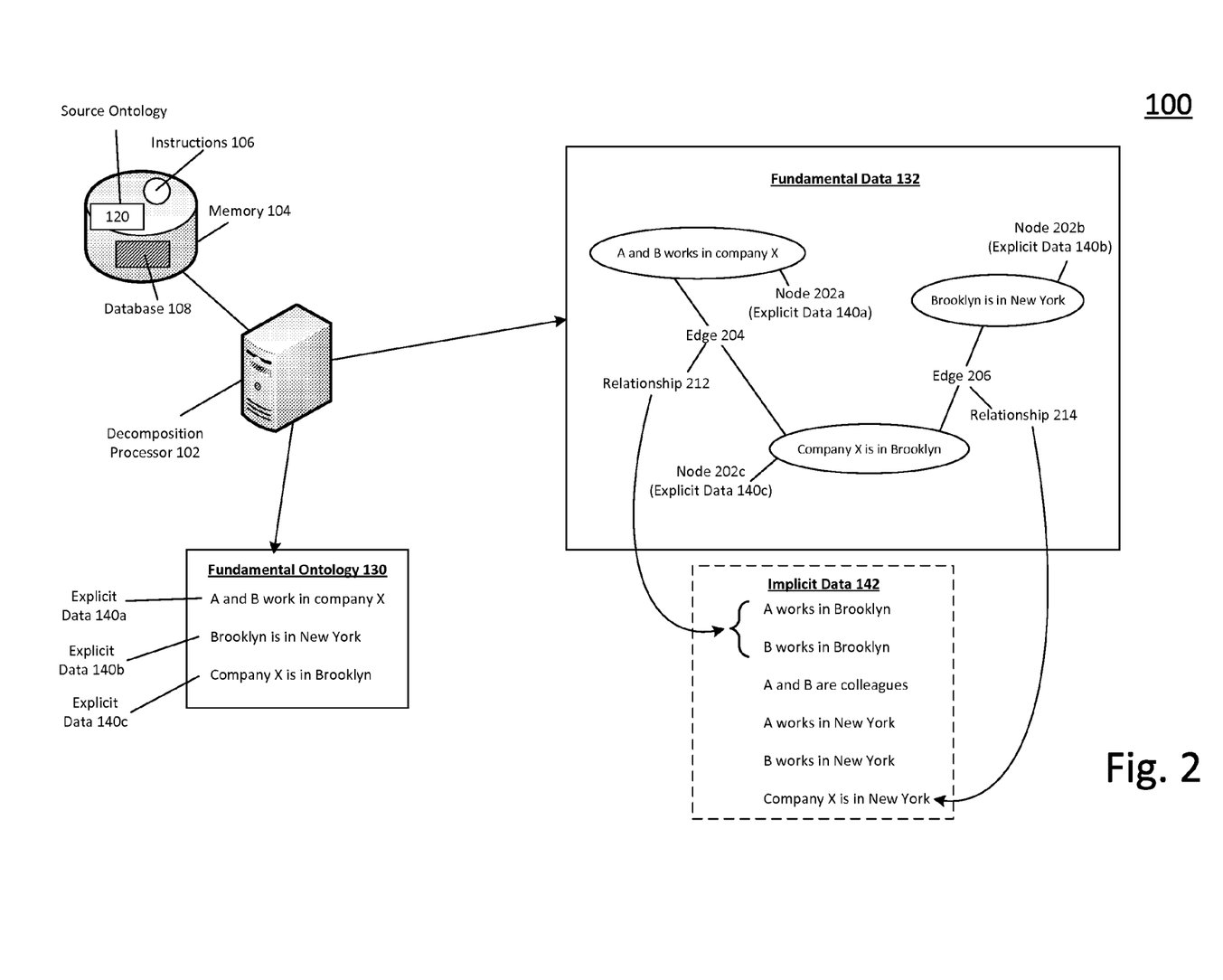
FIG. 2 illustrates the example system of FIG. 1 with additional detail relating to generation of fundamental data.

FIG. 2 illustrates the example system of FIG. 1 with additional detail relating to generation of fundamental data, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

In an example, after generation of fundamental ontology 130, decomposition processor 102 may generate fundamental data 132 based on fundamental ontology 130 and based on instructions 106. In some examples, decomposition processor 102 may generate fundamental data 132 in response to a receipt of fundamental ontology 130 from another entity such as another processor, memory, device, etc. Generation of fundamental data 132 may be further based on relationships among two or more pieces of explicit data 140 in fundamental ontology 130 (further described below). In some examples, fundamental data 132 may be represented as a graph that may include nodes 202 (including nodes 202a, 202b, 202c) and edges 204 (including edges 204, 206), where each node may represent a piece of explicit data 140 and each edge may represent a presence of one or more relationships between a pair of explicit data 140. Decomposition processor 102 may be configured to identify relationships among two or more pieces of explicit data 140 in fundamental ontology 130 in order to generate fundamental data 132.

An example relationship among two or more pieces of explicit data 140 may be a logic relation that may be effective to indicate a common concept, a common description, a common knowledge, etc., among the two or more pieces of explicit data 140. In some examples, a relationship among two or more pieces of explicit data 140 may be effective to produce one or more pieces of implicit data 142. In the example, decomposition processor 102 may compare explicit data 140a and explicit data 140c to identify a relationship between explicit data 140a, 140c. Identification of the relationship between explicit data 140a, 140c may be based on whether at least one piece of implicit data 142 may be produced based on explicit data 140a, 140c. As a result of the comparison, decomposition processor 102 may identify a similarity, such as "company X", in explicit data 140a and in explicit data 140c. In response to the identification of the similarity, decomposition processor 102, based on instructions 106, may determine that at least one piece of implicit data 142 may be produced based on explicit data 140a and explicit data 140c. For example, implicit data 142, such as "A works in Brooklyn", and "B works in Brooklyn", may be produced based on explicit data 140a and explicit data 140c. Decomposition processor 102 may identify a relationship 212 that may represent a logic relation that may be effective to produce implicit data 142 based on explicit data 140a and explicit data 140c.

Similarly, decomposition processor 102 may compare explicit data 140b and explicit data 140c to identify a relationship between explicit data 140b, 140c. As a result of the comparison, decomposition processor 102 may identify a similarity, such as "Brooklyn", in explicit data 140b and explicit data 140c. In response to the identification of the similarity, decomposition processor 102, based on instructions 106, may determine that at least one piece of implicit data 142 may be produced based on explicit data 140a and explicit data 140c. For example, implicit data 142, such as "Company X is in New York", may be produced based on explicit data 140b and explicit data 140c. Decomposition processor 102 may identify a relationship 214 that may represent a logic relation that may be effective to produce implicit data 142 based on explicit data 140b and explicit data 140c.

In the example, decomposition processor 102 may compare explicit data 140a and explicit data 140b to determine whether at least one piece of implicit data 142 may be produced based on explicit data 140a and explicit data 140b. As a result of the comparison, decomposition processor 102 may fail to identify a similarity between explicit data 140a and explicit data 140b. In response to the failure of identifying a similarity, decomposition processor 102, based on instructions 106, may determine that no implicit data 142 may be produced based on explicit data 140a and explicit data 140b. In some examples, implicit data 142 may be produced based on one piece of explicit data 140. For example, a piece of implicit data 142 such as "A and B are colleagues", may be produced based on explicit data 140a. In some examples, implicit data 142 may be produced based on more than two pieces of explicit data 140, and based on two or more relationships. For example, implicit data 142 such as "A works in New York" and "B works in New York" may be produced based on explicit data 140a, 140b, 140c, and based on relationships 212, 214.

In some examples, instructions 106 may be associated with semantic techniques, such as resolutions rules based on description logic or preposition logic. For example, instructions 106 may include a resolution rule, such as:

1) $\neg \exists x P(x) = \forall x \neg P(x)$
2) $\neg \forall x P(x) = \exists x \neg P(x)$
3) $\neg (P^{\wedge}Q) = \neg P v \neg Q$
4) $\neg (PvQ) = \neg P^{\wedge} \neg Q$ Continuing with the example, in response to the identification of relationship 212, relationship 214, and a failure to identify a relationship between explicit data 140a and explicit data 140b, decomposition processor 102 may generate fundamental data 132 based on fundamental ontology 130 and based on relationships 212, 214. In an example where fundamental data 132 may be a graph, decomposition processor 102 may generate fundamental data 132 such that explicit data 140a, 140b, 140c may each be represented by nodes 202a, 202b, 202c, respectively, and relationships 212, 214 may each be represented edges 204, 206, respectively. In some examples, decomposition processor 102 may store fundamental data 132 in memory 104.

Figure 3:
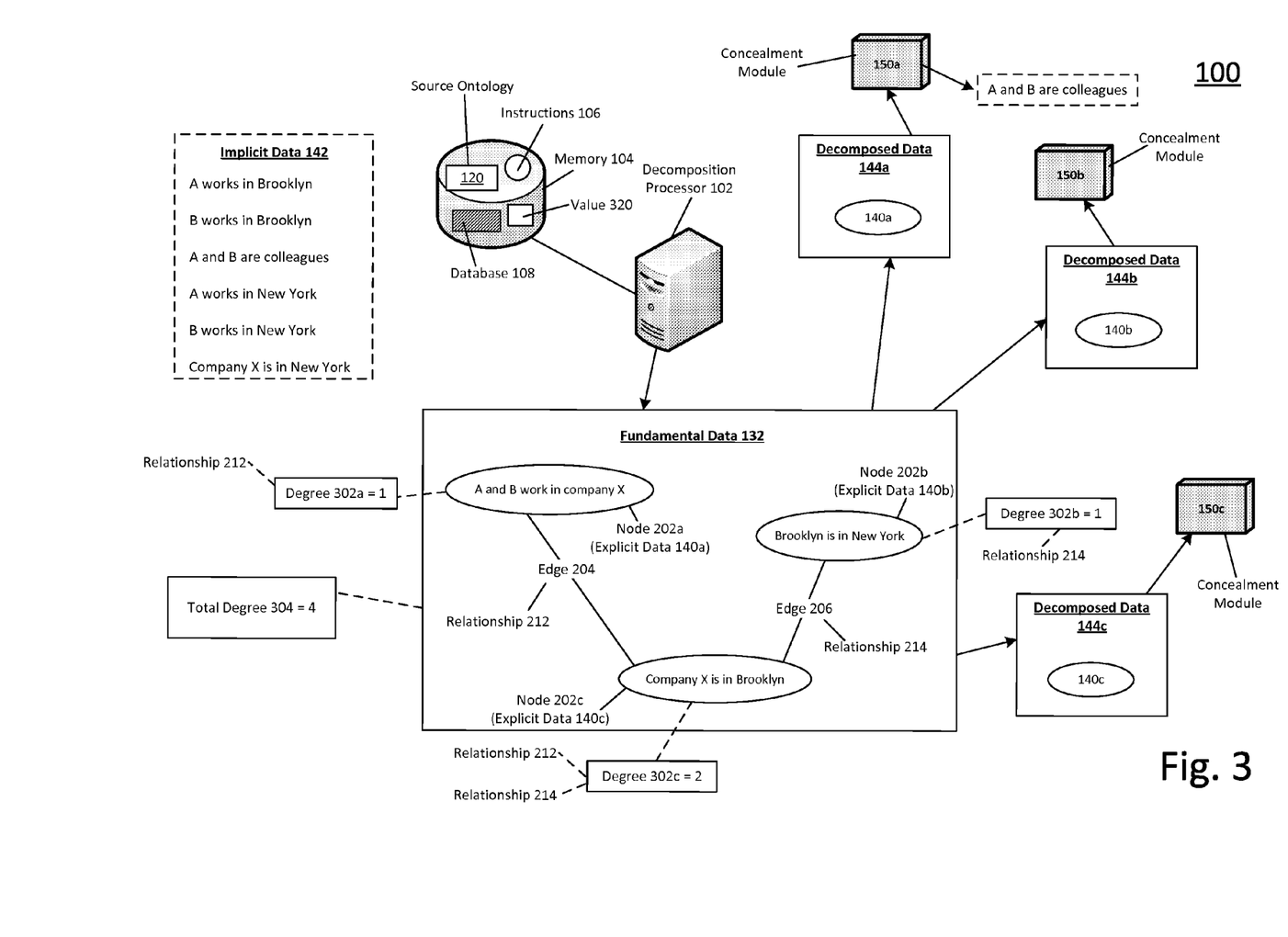
FIG. 3 illustrates the example system of FIG. 1 with additional detail relating to decomposition and storage of a source ontology.

FIG. 3 illustrates the example system of FIG. 1 with additional detail relating to decomposition and storage of a source ontology, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

Decomposition processor 102 may partition source ontology 120 into decomposed data 144 based on instructions 106 and/or based on fundamental data 132. In an example, memory 104 may be further configured to store a value 320 that may be effective to indicate a number of concealment modules 150. In some examples, value 320 may be received at decomposition processor 102 from another processor, device, or may be input by a user of system 100. Partition of source ontology 120, by decomposition processor 102, may be further based on value 320. Decomposition processor 102 may further be configured to determine degrees 302 (including degree 302a, 302b, 302c) of explicit data 140a, 140b, 140c, respectively, in fundamental data 132. A partition of source ontology 120, by decomposition processor 102, may be further based on degrees 302.

Each degree 302 may be associated with a number of edges connected to a corresponding node in fundamental data 132. A number of edges connected to a corresponding node may be effective to indicate a set of relationships, or a number of relationships associated with a corresponding explicit data. For example, degree 302a may be associated with a number of edges connected to node 202a, which may be effective to indicate a number of relationships associated with explicit data 140a. Decomposition processor 102 may be configured to count a number of edges connected to each node 202 of fundamental data 132 in order to determine degrees 302. In the example, decomposition processor 102 may count one edge (edge 204) connected to node 202a, one edge (edge 206) connected to node 202b, and two edges (edges 204, 206) connected to node 202c. In response to counting the number of edges connected to each node 202, decomposition processor 102 may determine that degree 302a may be "1", degree 302b may be "1" and degree 302c may be "2". Decomposition processor 102 may further determine a sum of degrees 302, such as a total degree 304, which, in the example, may be a value of "4".

Decomposition processor 102 may further sort degrees 302 in order to identify a node with a largest degree. In the example, in response to the sorting, decomposition processor 102 may determine that degree 302c of node 202c may be the largest degree among degrees 302. Decomposition processor 102 may partition source ontology 120 into one or more pieces of decomposed data 144c based on degree 302c. Subsequently, decomposition processor 102 may identify a next largest degree among degrees 302a, 302b. When degrees 302a, 302b are equivalent, such as in the depicted example, decomposition processor 102 may identify one of degrees 302a, 302b in a random manner. In the example, decomposition processor 102 may identify degree 302a and may partition source ontology 120 into one or more pieces of decomposed data 144a based on degree 302a.

In an example where value 320 may be "2" to indicate that there are two concealment modules 150a, 150c, decomposition processor 102 may determine whether to include explicit data 140b in decomposed data 144a or decomposed data 144c. In some examples, decomposition processor 102 may evaluate degree 302b with degrees 302a, 302c, and/or total degree 304 in order to determine whether to include explicit data 140b in decomposed data 144a or decomposed data 144c. For example, decomposition processor 102 may evaluate degree 302b with degree 302a of explicit data 140a included in decomposed data 144a, and/or with total degree 304, in order to determine whether to include explicit data 140b in decomposed data 144a. Similarly, decomposition processor 102 may evaluate degree 302b with degree 302c of explicit data 140c that is included in decomposed data 144c, and/or with total degree 304, in order to determine whether to include explicit data 140b in decomposed data 144c. In some examples, decomposition processor 102 may determine whether to include explicit data 140a in decomposed data 144c prior to an evaluation of explicit data 140b. In some examples, decomposition processor 102 may evaluate degrees 302 and total degree 304 based on relationships 212, 214. An example pseudocode that could be used to partition an ontology or graph may be stored in memory 104 or may be stored in respective concealment modules. The example pseudocode is shown below:

```
Input: graph: G
        given number of modules: n
Output: a set of subGraph: subG = {subGraph_f.... subGraph_i....
subGraph_a}
1.    compute degree for every node in the graph
2.    selection = 0;
3.    select the highest ranked node f from the G
4.    circle = 0; start = mod(selection)+1:   //control the end of the
      partition
5.    tmpG = subGraph_{mod(selection)+1}
6.    if number_of_edges (G) – number_of_edges (G/{f}) >
      number_of_edges(tmpGU {f}) – number_of_edges(tmpG)
7.        remove f from G, and add f into subG;
8.        go to step3;
9.    end if
10.   selection++; circle++;
11.   if mod(circle,n) == start
12.       break;
13.   end if
14.   go to step4;
15.   return subG:
```

After decomposition processor 102 partitioned source ontology 120 into decomposed data 144, decomposition processor 102 may store, or may distribute, decomposed data 144 among concealment modules 150. In the example, decomposed data 144a. 144b, 144c may be stored in concealment modules 150a, 150b, 150c, respectively. Decomposition processor 102 may further update database 108 to reflect that decomposed data 144a, 144b, 144c are stored in concealment modules 150a, 150b, 150c, respectively. In an example, if a malicious device gained unauthorized access to concealment module 150a, the malicious device may access implicit data that may be produced by explicit data 140a, but not implicit data that may be produced by a combination of explicit data 140b, 140c. In the example, if the malicious device gained unauthorized access to concealment module 150a, the malicious device may determine that "A and B are colleagues", but may not have access to implicit data such as "A and B are colleagues", etc.

Among other possible benefits, a system in accordance with the disclosure may provide a secured storage system for digital information such as an ontology. A system in accordance with the disclosure may allow portions of an ontology to be stored separately such that unauthorized access to a particular portion of the ontology may be insufficient to reproduce the ontology. By not being able to reproduce the ontology, a device which performed the unauthorized access may not be able to access the ontology as a whole, and therefore, may not be able to obtain implicit data. For example, a profile of a user on a social networking site may be partitioned into multiple portions and be stored separately in multiple memory modules, such that an unauthorized access to a portion of the profile may be insufficient to access the profile of the user.

Figure 4:
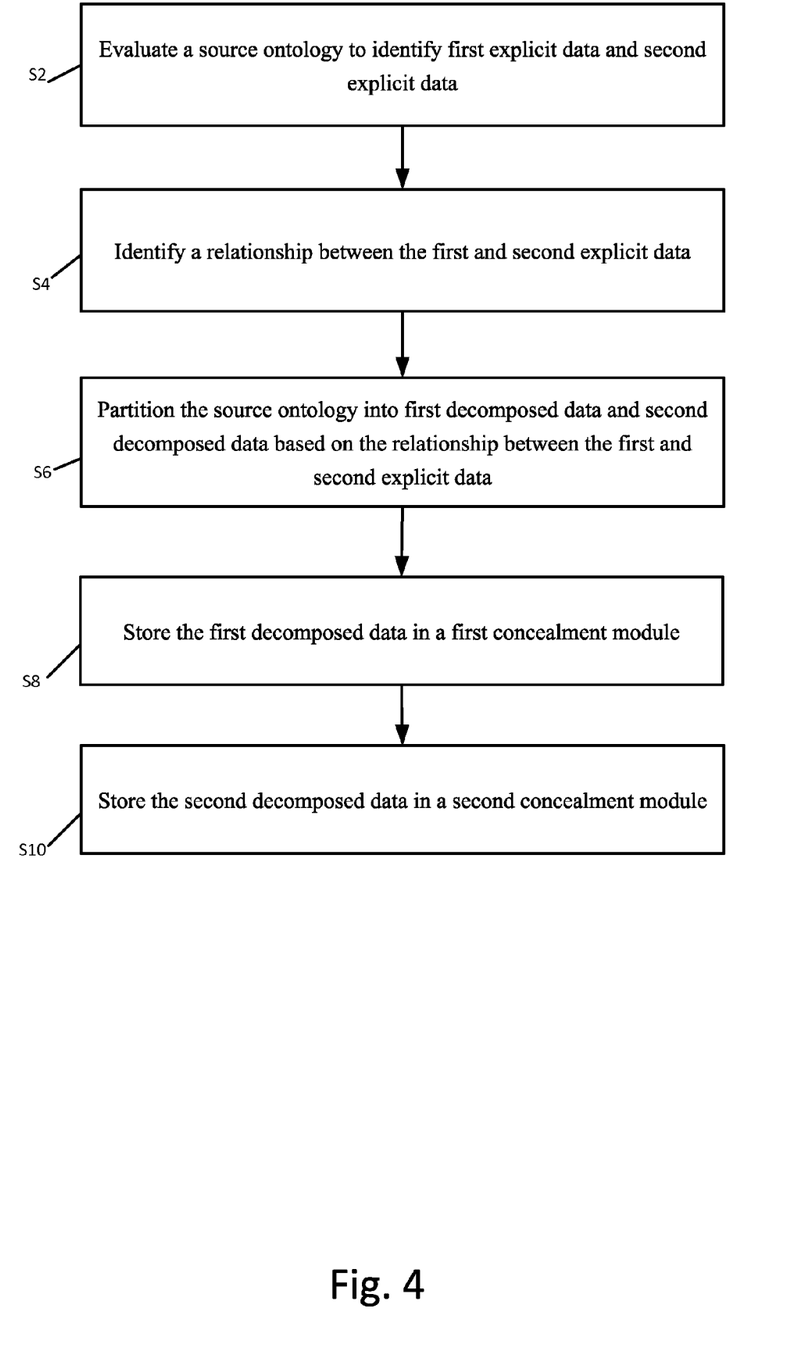
FIG. 4 illustrates a flow diagram for an example process to implement an ontology decomposer.

FIG. 4 illustrates a flow diagram for an example process to implement an ontology decomposer, arranged in accordance with at least some embodiments presented herein. The process in FIG. 4 could be implemented using, for example, system 100 discussed above. An example process may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the desired implementation.

Processing may begin at block S2, "Evaluate a source ontology to identify first explicit data and second explicit data". At block S2, a processor may evaluate a source ontology in order to identify first explicit data and second explicit data. The source ontology may be effective to represent the first explicit data and the second explicit data. In some examples, the source ontology may be effective to represent additional explicit data, such as third explicit data. In some examples, the processor may determine that the third explicit data is deduced based on the first explicit data. In some examples, the identification of the first and second explicit data may be based on the determination that the third explicit data may be deduced based on the first explicit data. The processor may generate a fundamental ontology based on the first and second explicit data. The fundamental ontology may include the first and second explicit data, and may exclude the third explicit data.

Processing may continue from block S2 to block S4, "Identify a relationship between the first and second explicit data". At block S4, the processor may identify a relationship between the first and second explicit data. The processor may generate fundamental data based on the fundamental ontology and based on the relationship between the first and second explicit data. In some examples, the fundamental data may include an indication of the relationship between the first and second explicit data.

Processing may continue from block S4 to block S6, "Partition the source ontology into first decomposed data and second decomposed data based on the relationship between the first and second explicit data". At block S6, the processor may partition the source ontology into first decomposed data and second decomposed data based on the relationship between the first and second explicit data. The first decomposed data may include the first explicit data. The second decomposed data may include the second explicit data. In some examples, the processor may partition the source ontology into the first and second decomposed data based on the fundamental data. In some examples, the processor may determine a first degree of the first explicit data, where the first degree may be effective to indicate a first set of relationships that may include the relationship between the first and second explicit data. The first set of relationships may be further effective to produce a first set of implicit data. The processor may determine a second degree of the second explicit data, where the second degree may be effective to indicate a second set of relationships that may include the relationship between the first and second explicit data. The second set of relationships may be further effective to produce a second set of implicit data. In some examples, the processor may partition the source ontology and/or the fundamental ontology into the first and second decomposed data based on the first and second degrees.

Processing may continue from block S6 to block S8. "Store the first decomposed data in a first concealment module". At block S8, the processor may store the first decomposed data in a first concealment module. In some examples, the source ontology may further represent third explicit data that may not be deduced based on the first and/or second explicit data. The processor may identify the third explicit data, and may partition the source ontology into the first decomposed data such that the first decomposed data may include the first and third explicit data.

Processing may continue from block S8 to block S10, "Store the second decomposed data in a second concealment module". At block S10, the processor may store the second decomposed data in a second concealment module. In some examples, a number of concealment modules may be equal to a number of decomposed data partitioned by the processor.

Figure 5:
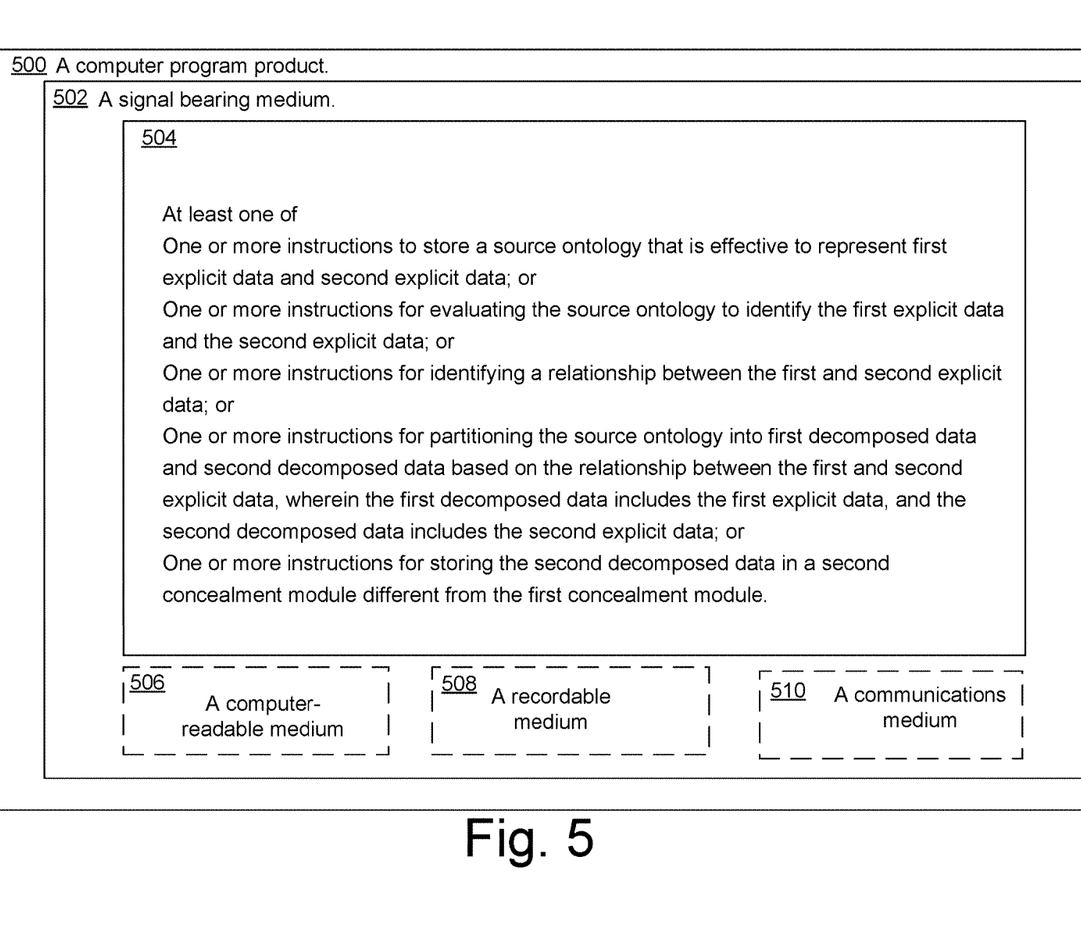
FIG. 5 illustrates an example computer program product that can be utilized to implement an ontology decomposer.

FIG. 5 illustrates an example computer program product that can be utilized to implement an ontology decomposer, arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, decomposition processor 102 may undertake one or more of the blocks shown in FIG. 4 in response to instructions 504 conveyed to the system 100 by signal bearing medium 502.

In some implementations, signal bearing medium 502 may encompass a computer-readable medium 506, such as, but not limited to, a hard disk drive (HDD), a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

Figure 6:
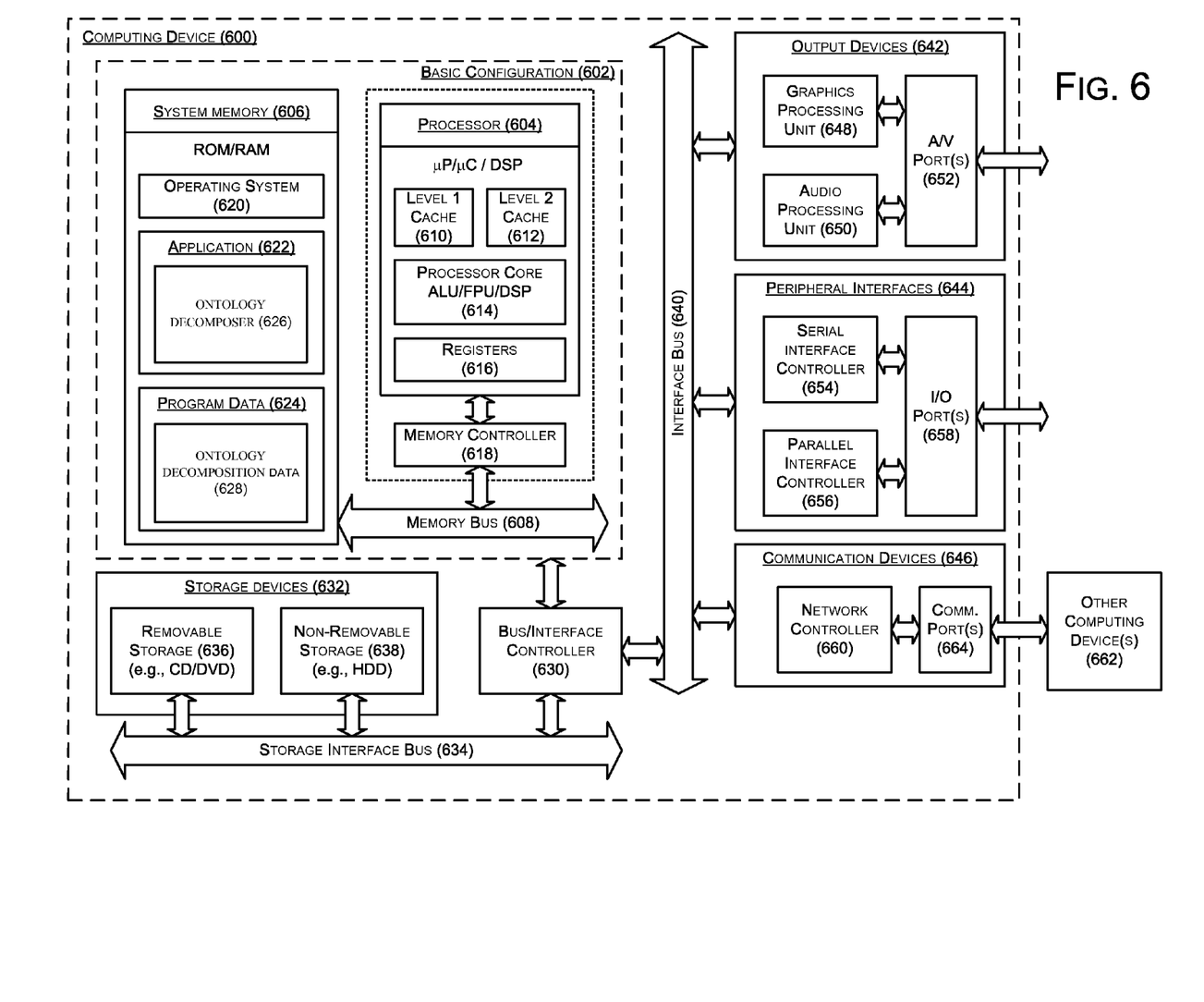
FIG. 6 is a block diagram illustrating an example computing device that is arranged to implement an ontology decomposer, all arranged according to at least some embodiments described herein.

FIG. 6 is a block diagram illustrating an example computing device 600 that is arranged to implement an ontology decomposer, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include an ontology decomposer 626 that is arranged to perform the functions as described herein including those described with respect to system 100 of FIGS. 1-5. Program data 624 may include ontology decomposition data 628 that may be useful for implementation of an ontology decomposer as is described herein. In some embodiments, application 622 may be arranged to operate with program data 624 on operating system 620 such that implementations of an ontology decomposer may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will also be understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to store a source ontology that is effective to represent first explicit data and second explicit data, the method comprising:
    evaluating the source ontology to identify the first explicit data and the second explicit data;
    identifying a degree of a relationship between the first explicit data and the second explicit data;
    determining a first degree of the first explicit data, wherein the first degree is effective to indicate a first set of relationships that includes the relationship between the first explicit data and the second explicit data, and wherein the first set of relationships is effective to produce a first set of implicit data;
    determining a second degree of the second explicit data, wherein the second degree is effective to indicate a second set of relationships that includes the relationship between the first explicit data and the second explicit data, and wherein the second set of relationships is effective to produce a second set of implicit data;
    partitioning the source ontology into first decomposed data based on the first degree and partitioning the source ontology into second decomposed data based on the second degree, wherein the first decomposed data includes the first explicit data, and the second decomposed data includes the second explicit data;
    storing the first decomposed data in a first concealment module; and
    storing the second decomposed data in a second concealment module different from the first concealment module.

2. The method of claim 1, wherein the source ontology is further effective to represent third explicit data, the method further comprising, prior to partitioning the source ontology:
    determining that the third explicit data is deduced based on the first explicit data;
    generating a fundamental ontology based on the first explicit data and the second explicit data, wherein the fundamental ontology includes the first explicit data and the second explicit data, and wherein the fundamental ontology excludes the third explicit data; and
    generating fundamental data based on the fundamental ontology and based on the identified degree of relationship between the first explicit data and the second explicit data, wherein partitioning the source ontology is further based on the fundamental data.

3. The method of claim 2, wherein the fundamental data includes an indication of the relationship between the first explicit data and the second explicit data.

4. The method of claim 1, wherein the source ontology is further effective to represent third explicit data, the method further comprising:
identifying the third explicit data based on the evaluation of the source ontology;
determining a third degree of the third explicit data, wherein the third degree is effective to indicate a third set of relationships that includes the relationship between the first explicit data and the second explicit data, and wherein the third set of relationships is effective to produce a third set of implicit data; and
partitioning the source ontology into the first decomposed data is further based on the third degree, wherein the first decomposed data includes the first explicit data and the third explicit data.

5. The method of claim 1, further comprising:
determining that the first degree is greater than the second degree; and
in response to the first degree being greater than the second degree, partitioning the source ontology into the first decomposed data prior to partitioning the source ontology into the second decomposed data.

6. The method of claim 1, prior to partitioning the source ontology, the method further comprising obtaining a value effective to indicate a number of concealment modules, and wherein partitioning the source ontology into the first decomposed data and the second decomposed data is further based on the value.

7. The method of claim 1, wherein a number of pieces of decomposed data is equal to a number of concealment modules.

8. A system effective to store a source ontology that is effective to represent first explicit data and second explicit data, the system comprising:
a memory configured to store the source ontology;
a first concealment module;
a second concealment module;
a processor configured to be in communication with the memory, the first concealment module, and the second concealment module, the processor being configured to:
evaluate the source ontology to identify the first explicit data and the second explicit data;
identify a degree of a relationship between the first explicit data and the second explicit data;
determine a first degree of the first explicit data, wherein the first degree is effective to indicate a first set of relationships that includes the relationship between the first explicit data and the second explicit data, and wherein the first set of relationships is effective to produce a first set of implicit data;
determine a second degree of the second explicit data, wherein the second degree is effective to indicate a second set of relationships that includes the relationship between the first and second explicit data, and the second set of relationships is effective to produce a second set of implicit data;
partition the source ontology into first decomposed data based on the first degree and partition the source ontology into second decomposed data based on the second degree, wherein the first decomposed data includes the first explicit data, and wherein the second decomposed data includes the second explicit data;
store the first decomposed data in the first concealment module; and
store the second decomposed data in the second concealment module.

9. The system of claim 8, wherein the source ontology is further effective to represent third explicit data, the processor being further configured to:
determine that the third explicit data is deduced based on the first explicit data;
generate a fundamental ontology based on the first explicit data and the second explicit data, wherein the fundamental ontology includes the first explicit data and the second explicit data, and wherein the fundamental ontology excludes the third explicit data; and
generate fundamental data based on the fundamental ontology and based on the identified degree of relationship between the first explicit data and the second explicit data, wherein the partition of the source ontology is further based on the fundamental data.

10. The system of claim 8, wherein the source ontology is further effective to represent third explicit data, the processor being further configured to:
identify the third explicit data based on the evaluation of the source ontology;
determine a third degree of the third explicit data, wherein the third degree is effective to indicate a third set of relationships that includes the relationship between the first explicit data and the second explicit data, wherein the third set of relationships is effective to produce a third set of implicit data,
wherein the partition of the source ontology into the first decomposed data is further based on the third degree, and wherein the first decomposed data includes the first explicit data and the third explicit data.

11. The system of claim 8, wherein the memory is further configured to store a value effective to indicate a number of concealment modules, and wherein the processor is further configured to partition the source ontology into the first decomposed data and the second decomposed data based on the value.

12. A device effective to partition an ontology that is effective to represent first explicit data and second explicit data, the device comprising:
a memory;
a receiver unit configured to receive the ontology in the memory; and
a decomposition unit processor configured to be in communication with the receiver unit, the decomposition unit processor being configured to:
identify a degree of a relationship between the first explicit data and the second explicit data;
generate fundamental data based on the ontology and based on the identified degree of the relationship between the first explicit data and the second explicit data;
determine a first degree of the first explicit data, wherein the first degree is effective to indicate a first set of relationships that includes the relationship between the first explicit data and the second explicit data, and wherein the first set of relationships is effective to produce a first set of implicit data;
determine a second degree of the second explicit data, wherein the second degree is effective to indicate a second set of relationships that includes the relationship between the first explicit data and the second explicit data, and wherein the second set of relationships is effective to produce a second set of implicit data;

partition the ontology into first decomposed data based on the first degree and the fundamental data and partition the ontology into second decomposed data based on the second degree and the fundamental data, wherein the first decomposed data includes the first explicit data, and wherein the second decomposed data includes the second explicit data;

send the first decomposed data to a first concealment module; and send the second decomposed data to a second concealment module.

13. The device of claim 12, wherein the decomposition unit processor is further configured to:

determine that the first degree is greater than the second degree; and in response to the first degree being greater than the second degree, partition the ontology into the first decomposed data prior to the partition of the ontology into the second decomposed data.

14. The device of claim 12, wherein the receiver unit is further configured to receive a value effective to indicate a number of concealment modules, and wherein the decomposition unit processor is further configured to partition the ontology into the first decomposed data and the second decomposed data based on the value.

* * * * *

UNITED STATES PATENT AND TRADEMARK OFFICE
CERTIFICATE OF CORRECTION

PATENT NO. : 9,740,763 B2  Page 1 of 1
APPLICATION NO. : 14/777668
DATED : August 22, 2017
INVENTOR(S) : Fang et al.

It is certified that error appears in the above-identified patent and that said Letters Patent is hereby corrected as shown below:

In the Specification

In Column 1, Line 3, delete "CROSSREFERENCE" and insert -- CROSS-REFERENCE --, therefor.

In Column 4, Line 56, delete "fundamental based" and insert -- fundamental, based --, therefor.

In Column 5, Line 38, delete "150a." and insert -- 150a, --, therefor.

In Column 7, Line 7, delete "3) ¬ (P^Q)=¬ Pv¬ Q" and insert -- 3) ¬ (P∧Q)=¬ Pv¬ Q --, therefor.

In Column 7, Line 7, delete "4) ¬ (PvQ)=¬ P^¬ Q" and insert -- 4) ¬ (PvQ)=¬ P∧ ¬ Q --, therefor.

In Column 8, Line 65, delete "144a." and insert -- 144a, --, therefor.

In Column 10, Line 23, delete "S8." and insert -- S8, --, therefor.

In Column 12, Line 28, delete "signal such" and insert -- signal, such --, therefor.

In Column 13, Line 36, delete "A. B," and insert -- A, B, --, therefor.

In Column 13, Line 44, delete "general such" and insert -- general, such --, therefor.

In the Claims

In Column 15, Lines 58-59, in Claim 8, delete "first and second explicit data, and the" and insert -- first explicit data and the second explicit data, and wherein the --, therefor.

In Column 17, Line 2, in Claim 12, delete "data and" and insert -- data, and --, therefor.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*